Jan. 16, 1940.   O. A. KEHLE   2,187,241
OILER FOR AIR TOOLS
Filed April 8, 1936
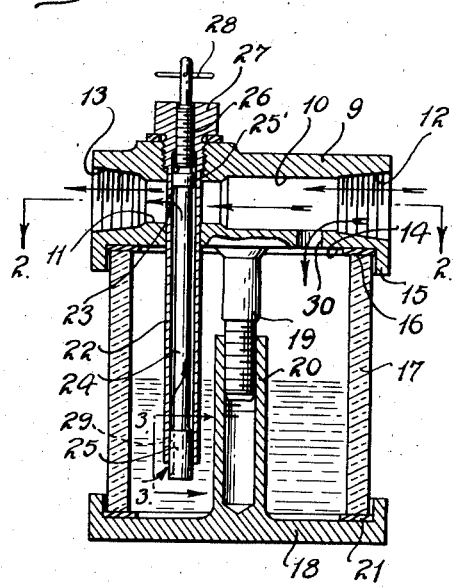
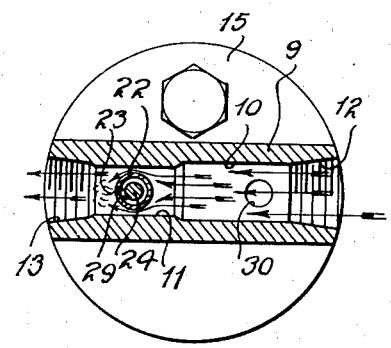
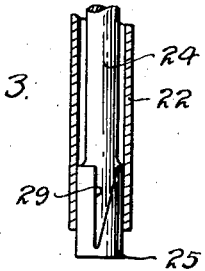
INVENTOR
OTTMAR A. KEHLE.
BY
ATTORNEY Patented Jan. 16, 1940

2,187,241

UNITED STATES PATENT OFFICE 2,187,241

OILER FOR AIR TOOLS

Ottmar A. Kehle, Detroit, Mich., assignor to Sterling Products Company, Detroit, Mich., a corporation of California Application April 8, 1936, Serial No. 73,283

3 Claims. (Cl. 184—55)

My invention relates to a new and useful improvement in an oiler for air tools and has for its object the provision of a simple device which may be interposed in the air line and which will serve to automatically lubricate the moving parts of air tools upon delivery of air thereto.

It is another object of the invention to provide a device of this class which will be simple in structure, economical of manufacture, durable and highly efficient in use.

Another object of the invention is the provision of an oiling device of this class so arranged and constructed that, when interposed in an air line, the air passing through the line will be provided with an amount of lubricant, which amount may be predetermined.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central, vertical, sectional view of the invention.

Fig. 2 is a sectional view taken on line 2—2 of Fig. 1.

Fig. 3 is a sectional view taken on line 3—3 of Fig. 1 slightly enlarged.

In all forms of the invention, I provide a head 9 having the passage 10 formed therethrough and provided with the constricted portion 11, the ends of the passage terminating in the threaded openings 12 and 13. The undersurface of the head is cut away as at 14 to provide the peripheral flange 15. In this cut away portion there is provided an annular gasket 16 against which engages the end of the cylindrical member 17 which is preferably formed from glass or other transparent material and which, with the base 18, forms the receptacle or bowl in which the lubricant is deposited. Projecting downwardly from the head, centrally thereof, is a stud 19 having the lower end threaded and adapted for threading into the tubular sleeve 20 which projects upwardly centrally from the base 18. A gasket 21 engages the lower end of the cylindrical member 17. By threading and unthreading the base 18, the receptacle may be placed on the head or removed therefrom as desired.

In the form shown in Fig. 1 I have mounted on the head a tube 22 which traverses the constricted passage 11 and which is provided with an opening 23 communicating with the passage 11. This tube terminates above the bottom 18. Slidably projected through the tube is a rod 24 of smaller outside diameter than the inside diameter of the tube 22. This rod carries on its lower end a head 25 which is a snug fit for the tube. The upper end is also provided with a head 25' which serves as a seal for the upper end of this rod. The upper end of the rod 24 is provided with the threaded connection 26 which threads into the nut 27 mounted in the head 9. The cross bar 28 serves as a gripping member for rotating the threaded connection 26. Formed at the periphery of the head 25 is a V shaped groove 29, the open end thereof being faced upwardly and the closed end terminating inwardly from the end of the head 25.

The construction is such that when the threaded connection 26 is rotated to extend the head 25 sufficiently below the lower end of the tube 22 to expose the groove 29, the air passing through the passage 10 in the direction indicated by the arrows will, in part be diverted so as to pass through the opening 30 into the interior of the reservoir. The air passing around the tube 22 will draw lubricant out of the tube and this aspirating effect will be assisted by the air which enters the reservoir through the opening 30. Thus, it is obvious that by moving the head 25 axially, the width of the groove 29 exposed will be determined and the amount of lubricant allowed to pass through the opening 23 thus adjusted. The air after passing outwardly from the constricted passage 11 will carry the lubricant with it and thus afford a means for lubricating the working parts which are driven by the compressed air.

It will be noted that the portion of the tube or conductor which extends into the passage 10 is impervious to air on the anterior side, that is the side which is fixed toward the direction from which the air is coming. The air under pressure striking this impervious body is deflected around the tube and after passing the tube tends naturally to resume its former path, but this takes place a short distance beyond the posterior side of the conductor so that there is thus created around the opening 23 an area of semi-vacuum. By this it is meant that the air pressure around the opening 23 at the posterior side of the conductor is of considerably less pressure than the air pressure in the remainder of the passage 10. This diverting of the air from its normal path by presenting a hindering object is important in that by so doing, the movement of the lubricant into the passage 10 is effected other than merely by capillary attraction or merely by the air picking up the lubricant present so that it would be replaced by other lubricant.

The cross sectional area of opening 30 is relatively greater than that of the outlet orifice 23 so that an effective pressure differential is provided as between the reservoir and the outlet orifice 23. Furthermore, the capillary member—the rod 24—extends from a point of immersion in the oil in the reservoir to a point above the outlet orifice. All these features contribute to affording a device which functions properly even when extremely low air pressures are used in the passageway 10, because not only does the effective pressure within the reservoir tend to force the oil upwardly in the tube to the outlet orifice but the capillary member conducts it to a point opposite the outlet orifice so that even the slightest vacuum induced by the air stream being divided by the tube and the divisions converging at a point spaced directly in front of the outlet orifice, will act to draw oil from the closely adjacent capillary member. The reduced diameter portion of the air passageway 10 which is traversed by the tube, further aids in obtaining proper operation at all pressures inasmuch as it increases the velocity of the air moving around the tube.

While I have illustrated and described the preferred form of construction, I do not wish to limit myself to the precise details of structure shown, but desire to avail myself of such variations and modifications as may appear within the scope of the appended claims.

Having thus described my invention, what I claim as new and desire to secure by Letters Patent is:

1. An oiling device of the class described, adapted for being interposed in an air line used for operating air tools, comprising: a head having a passage formed therein, the opposite ends of said passage being adapted for reception of interrupted ends of an air line; a reservoir mounted on said head and communicating with said passage; a tubular member carried by said head and projected through said passage and into said reservoir and having an opening in the portion lying in said passage, the end of said tubular member in said reservoir being immersed in lubricant contained therein; means projected through and slideable of said tube for closing said end of said tube and opening the same variable amounts; and means accessible exteriorly of said head and in alignment with said tube closing means for effecting slideable movement of said tube closing means.

2. An oiling device of the class described, comprising: a head having a passage formed therein; a lubricant receiving reservoir mounted on said head and communicating with said passage; a tube in communication with the lubricant in said reservoir and extending into said passage and opening thereinto; a rod projecting through and slideable of said tube, the inner end of said rod snugly fitting said tube and having a groove formed in its periphery for, upon the projection of said rod beyond the inner end of said tube, establishing communication of the inner end of said tube with said reservoir and permitting passage of lubricant from said reservoir into said tube.

3. An oiling device for interposition in an air line, comprising in combination: a casing having an air passageway therethrough and an oil reservoir therein, an inlet opening in the casing establishing communication from said passageway to said reservoir, a tube in the casing and extending transversely through said passageway, said tube having its inlet end within the reservoir, an outlet orifice in said tube communicating with the air passageway, a rod mounted within and slidable along said tube, said rod having on its inner end a head projecting beyond the inlet end of the tube, said head snugly fitting against the inner wall of said tube and being provided with a V-shaped slot adjacent the inner end of the rod, and means for adjustably moving and positioning said head with respect to the inlet end of said tube.

OTTMAR A. KEHLE.